(No Model.) 4 Sheets—Sheet 2.

H. BLAND.
GEAR FOR DRIVING SMALL MACHINES.

No. 512,858. Patented Jan. 16, 1894.

Witnesses:
H. G. Dieterich
B. W. Sommers

Inventor:
Henry Bland

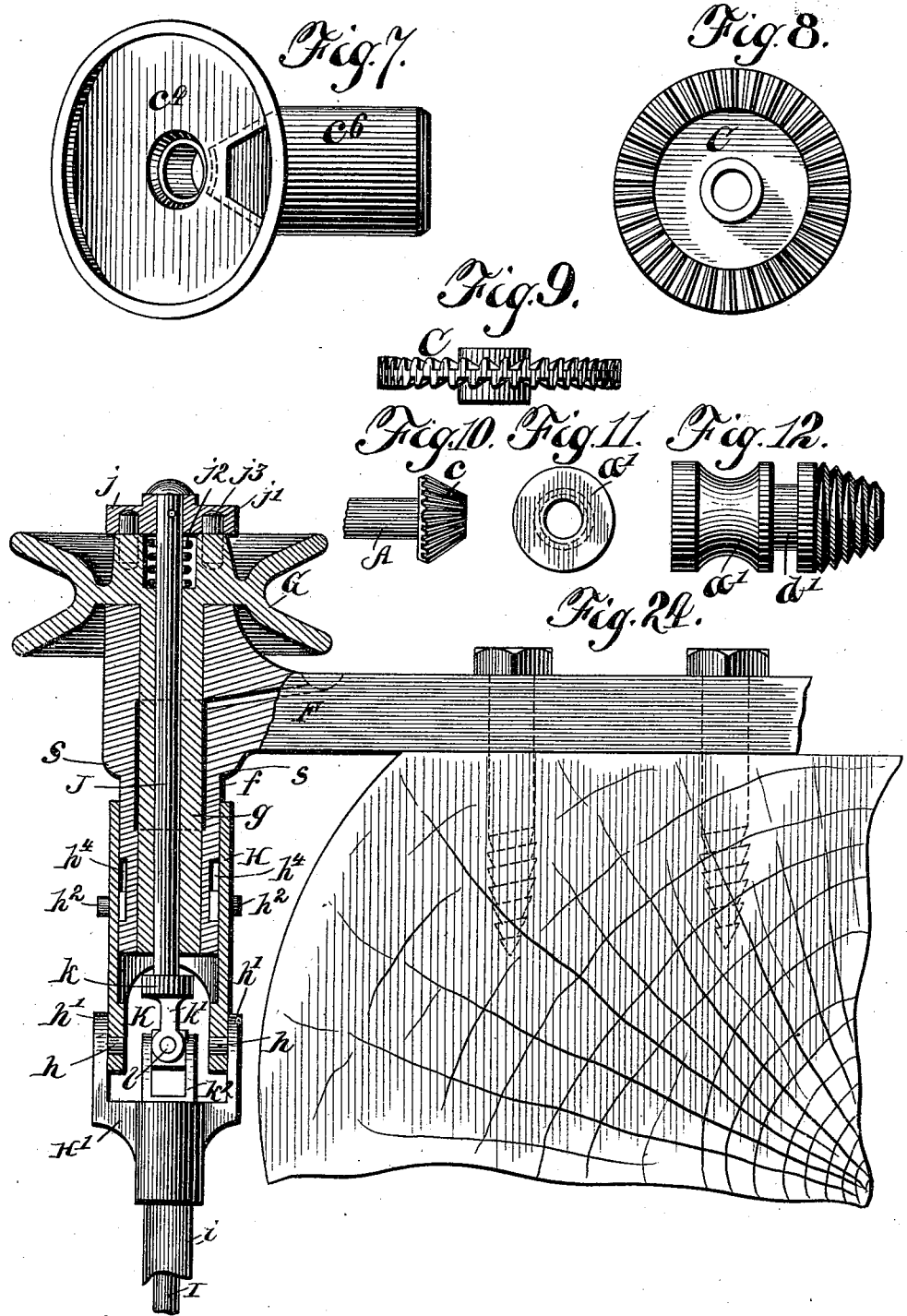

(No Model.) 4 Sheets—Sheet 4.
H. BLAND.
GEAR FOR DRIVING SMALL MACHINES.
No. 512,858. Patented Jan. 16, 1894.
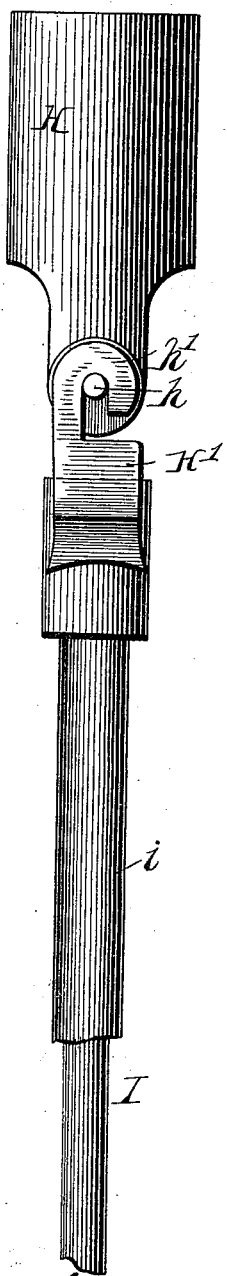
Fig. 25. Fig. 26. Fig. 27.
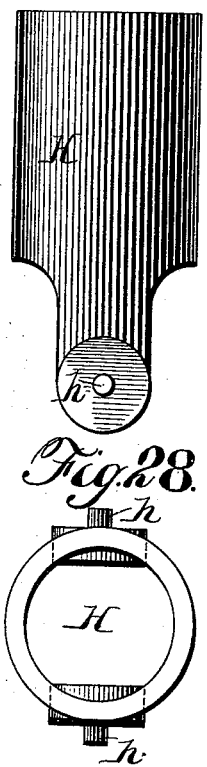
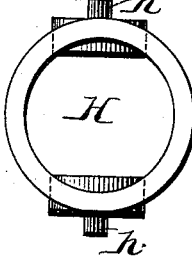
Fig. 28.
Fig. 29.
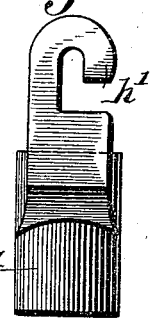
Fig. 30.
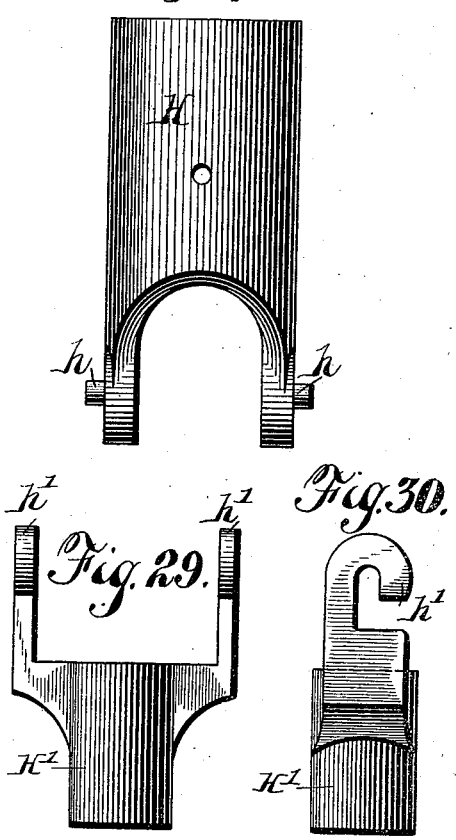
Fig. 31.
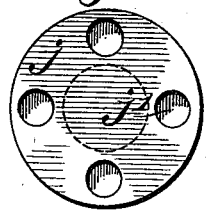
Fig. 32.
Witnesses:
H. G. Dieterich
B. W. Sommers
Inventor:
Henry Bland
By Henry Orth
Atty.

UNITED STATES PATENT OFFICE.

HENRY BLAND, OF LEICHARDT, NEAR SYDNEY, NEW SOUTH WALES.

GEAR FOR DRIVING SMALL MACHINES.

SPECIFICATION forming part of Letters Patent No. 512,858, dated January 16, 1894.

Application filed March 23, 1893. Serial No. 467,396. (No model.)

*To all whom it may concern:*

Be it known that I, HENRY BLAND, engineer, a subject of the Queen of Great Britain, and a resident of Norton Street, Leichardt, near Sydney, in the British Colony of New South Wales, have invented Improved Gear for Driving Small Machines, such as those used for sheep-shearing purposes, of which the following is a specification.

This invention has been devised for the purpose of providing an improved gear for driving small machines, such as those used for sheep shearing purposes.

It comprises—first, a detachable overhead gear, which can readily be fixed in a very short time even by an unskilled workman, and which can be removed without loss of time; second, a universal coupling, which is very simple in construction, and not liable to become accidentally displaced, while it can be quickly disconnected if required; third, a counter-balance lever, which is used for taking some of the weight of the machine off the user's hand when the invention is applied to hand machines, such as sheep shearing machines; fourth, a universal joint for the geared ends of the driving and driven shafts which is entirely inclosed within a dust-proof casing.

Referring to the accompanying drawings—

Figure 1:
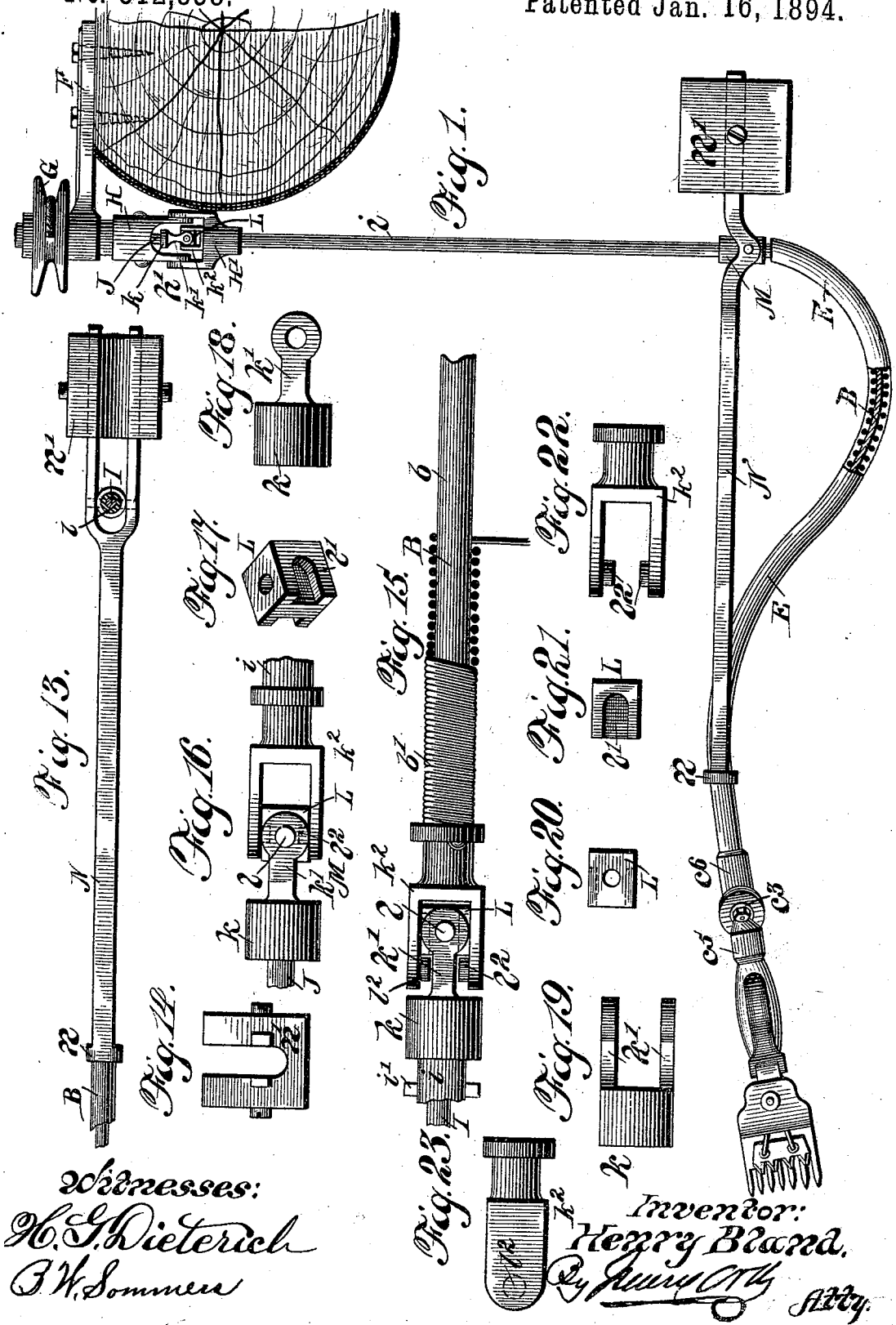
Figure 2:
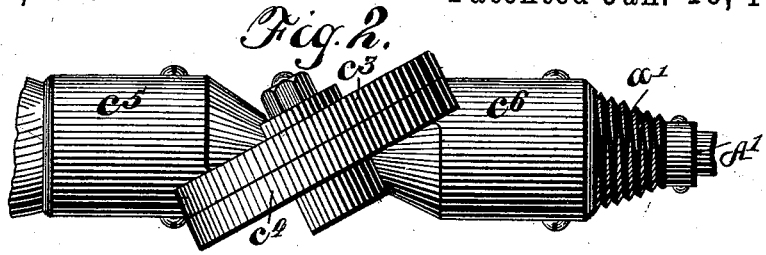
Figure 3:
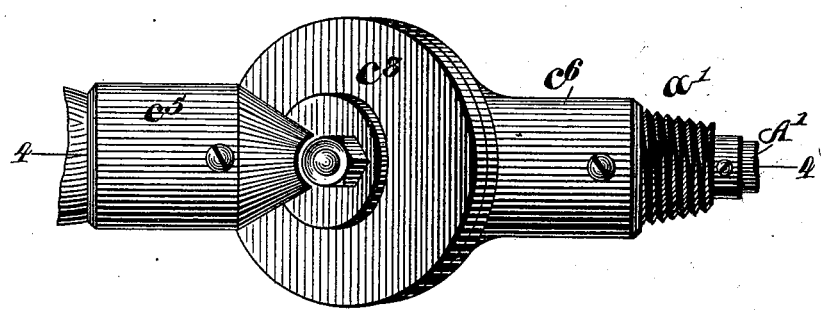
Figure 4:
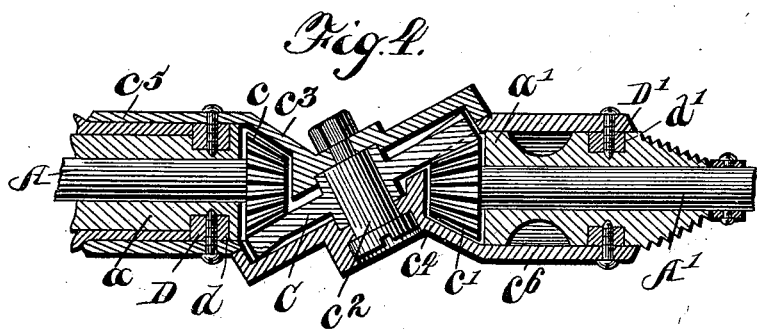
Figure 5:
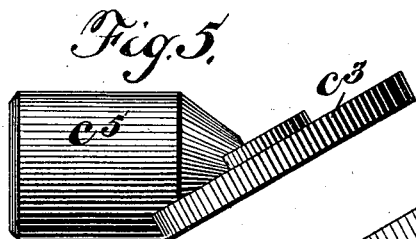
Figure 6:
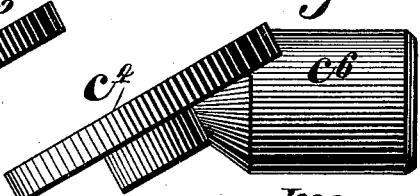

Figure 1 is a general view, showing the complete arrangement of my improved gear for driving small machines, illustrating it as applied to a sheep shearing machine. Fig. 2 is a side elevation, and Fig. 3 is a plan of the universal joint above referred to. Fig. 4 is a vertical central section on line 4—4, Fig. 3. Fig. 5 is a side elevation of the left hand part of the casing of the universal joint, and Fig. 6 is a similar view of the right hand part thereof, while Fig. 7 is a plan of said right hand half of said casing. Fig. 8 is a plan, and Fig. 9 a side elevation of the double-toothed crown wheel constituting part of the joint. Fig. 10 is a side elevation of one of the bevel pinions which engages with said crown wheel. Fig. 11 is an end elevation, and Fig. 12 a side elevation of another part of said joint. Fig. 13 is a plan, and Fig. 14 an end elevation of the counterbalanced lever which I use for partially supporting the machine driven by my gear. Fig. 15 is a plan of part of the flexible driving shaft, together with a universal coupling, whereby it may be connected with the spindle by which it is driven, the parts being shown in the position for disconnecting the spindle sections. Fig. 16 is a side elevation of said universal coupling, and Fig. 17 is a perspective view of the connecting block used therein. Fig. 18 is a side elevation, and Fig. 19 a plan of one half of said universal coupling. Fig. 20 is a side elevation, and Fig. 21 a plan of the rectangular connecting block shown in Fig. 17. Figs. 22 and 23 are similar views to Figs. 18 and 19 but illustrating the opposite half of said universal coupling. Fig. 24 is a sectional elevation, showing the overhead part of my improved gear fitted in position, and having a driving spindle connected to it. Fig. 25 is a front elevation of part of the device used for connecting the sheathing of said spindle with said overhead. Figs. 26, 27, and 28 are respectively side and front elevations and plan of part of said device for connecting the casing of said spindle to the overhead, and Figs. 29 and 30 are front and side elevations respectively of the lower part of said connecting device. Fig. 31 is a side elevation, and Fig. 32 a plan of part of the contrivance used for automatically throwing the driving spindle out of gear when it is lifted.

The same letters of reference indicate the same parts in all the figures of drawings described.

The driving shaft of the apparatus is constructed of rigid and flexible sections, some of which are jointed together by means of universal joints or couplings, and said driving shaft is connected with the driven shaft by means of a joint or coupling so arranged as not to interfere with movements of the driven shaft in a plane perpendicular to the major axis of the shafts, as is necessary when the driven shaft is caused to operate the cutter bar or plate of a sheep shearing apparatus.

I will first describe the joint or coupling between the driven shaft and the rigid end section of the driving shaft, reference being had to Figs. 2 to 11 inclusive. This joint consists of a double crown wheel C, Figs. 4, 8, and 9, that is formed with teeth upon both faces and adapted to gear with two bevel pinions, c and c', the former being fitted or formed upon the end of the driven shaft A, and the latter upon the rigid end section A′ of the driving shaft, Fig. 4, the shaft section A′ being secured to one end of the flexible section B of the driving shaft in the ordinary manner, or any other convenient manner. This double crown wheel, C, works upon a screwed stud or bolt, $c^2$, passing through the center of and connecting the two casings, $c^3$ and $c^4$, Figs. 2 to 7, the former of which is formed with a sleeve $c^5$ encircling a bush $a$, Fig. 4, in which the driven shaft A rotates, while the casing $c^4$ is formed with a similar sleeve $c^6$, encircling a bush $a'$ through which the shaft section A′ passes. These two casings, $c^3$ and $c^4$, when connected together by the stud or bolt $c^2$ completely inclose the gearing, C, c c′, as illustrated in Figs. 2 and 3, but they are free to turn relatively to each other upon the central stud or bolt $c^2$ in a plane at an angle to the major axis of the driving and driven shafts. The sleeve $c^3$ is fitted over and secured to a split ring D, which is fitted into an annular recess $d$ formed around the bush $a$, and the sleeve $c^6$ is similarly secured to another split ring D′ fitted into an annular groove $d'$ (see Figs. 4 and 12) in the bush $a'$, to which the end of the usual sheathing E, Fig. 1, surrounding the flexible shaft B is secured in any convenient manner. The opposite end of the flexible section B of the driving shaft is coupled or joined to one end of a second rigid section I, of said shaft by means of a universal joint M, Fig. 15. This coupling is constructed as follows, (see also Figs. 16 to 23;) a forked piece $k^2$ is secured to said end of the flexible section B of the driving shaft, the arms or ears of which forked piece are provided with studs or projections $l^2$, a substantially similar forked piece $k$ being secured to one end of the rigid shaft section I, the arms or ears of which forked piece $k$ are reduced in width and are provided near their outer end with a pin hole for a pin $l$ that serves as a pivot for the polygonal block L through which the pin $l$ passes. The said block is provided with a groove or recess $l'$ in opposite sides extending from one edge of the block toward the other, and in said groove fit the projections $l^2$ on the ears of the forked piece $k^2$, the block serving to support the flexible shaft section B from the forked piece $k$ of the rigid shaft section I. Inasmuch as the pivot $l$ lies perpendicular to the recesses $l'$ the two sections have substantially universal motion, except an independent rotary motion about their own axes. On the other hand, the shaft sections may be readily uncoupled by moving them together so as to move the projections $l^2$ out of the recesses $l'$, see Fig. 15, and when the parts are in the position shown in said figure the forked piece $k$ is free to slide from between the fork of the piece $k^2$. The sheathing E for the shaft section B is secured to the forked piece $k^2$ in any desired manner, while the sheathing $i$ for the rigid shaft section I is similarly secured to the forked piece $k$. The sheathing $i$ above the coupling M has two studs $i'$ diametrically opposite each other, see Fig. 15, that serve as fulcrum for a lever N, whose rearward end is forked and carries a counter weight $n'$, while its forward end has a bearing for the end of the flexible section of the driving shaft near the coupling for the driven shaft whereby the weight of the driven machine, as a sheep shearing apparatus, is taken off the operator's hands in a great measure, as shown in Fig. 1. (See also Fig. 13.)

The described driving shaft is or may advantageously be driven from an overhead vertical spindle or shaft section, and, referring now to Fig. 1, and more particularly to Fig. 24, F indicates a bracket bolted to any convenient support (such for instance as a balk of timber) and having a downwardly projecting bush $f$ in which is fitted a sleeve $g$ projecting from a grooved driving pulley G from the upper face of which project pins $j'$. Over the bush $f$ is fitted a short sleeve or tube H whose lower end has two outwardly projecting pins $h$ diametrically opposite each other. A shaft section J extends through the driving pulley G and its sleeve $g$, one end of which shaft section is coupled to section I by means of a coupling M similar to that above described, which serves to couple the shaft sections I, B (and illustrated in Figs. 15 to 23, like parts of the coupling shown in said figures and Fig. 24 being indicated by like letters, so that a further description of the coupling Fig. 24 will not be necessary). To the forked piece $k^2$ on shaft I, or to the upper end of the sheathing $i$ for said shaft, is secured a forked piece H′ whose ears or branches $h'$ are hook shaped and adapted to hook on studs or pins $h$ projecting from the aforesaid sleeve H that has sliding motion on the bush $f$ and is guided along the same by guide pins $h^2$ that carry slide blocks fitting in vertical grooves $h^4$ formed in said bush $f$, see Fig. 24, and detail views of said parts Figs. 25 to 30 inclusive, by which means and the coupling that connects the shaft sections J and I, the parts can be readily detached.

As shown in Fig. 24, the bore of driving pulley G is enlarged for a portion of its length to accommodate a coiled spring $j^2$ on the end of shaft section J, said coiled spring having bearing on the coupling disk $j$ secured to the end of said shaft section, said coupling disk provided with sockets $j'$ for the reception of the pins $j^3$ projecting from the upper face of pulley G, by means of which the shaft section is locked to the pulley and caused to revolve therewith. The tendency of the aforesaid spring $j^2$ is to lift the shaft section and its coupling disk $j$ out of engagement with the pulley G, so that by relieving the disk of the weight of the shaft sections, that is to say, by slightly lifting shaft section J, it can be uncoupled from the driving pulley. Inasmuch as the shaft section J is lifted by spring $j^2$ simultaneously with shaft section I an uncoupling of the two sections cannot be effected unless means are provided to limit the upward motion of shaft section J so as to admit of a further upward motion of shaft section I to cause the lugs $l^2$ on arms $k'$ of forked piece $k$ to move clear of the grooves $l'$ in block $l$ pivoted in the arms of the forked piece $k^2$. The upward movement of shaft section J is limited by the head of the forked piece $k$ abutting against the under side of the pulley sleeve $g$. Of course when shaft section I is lifted the hooks $h'$ on the sleeve H′ will be moved upwardly and rest on said sleeve below the hooks, and in order to admit a further upward movement of shaft section I for the purpose above referred to, the sleeve H is adapted to move vertically on bush $f$ as described, so that when shaft sections I J have been moved to the limit of their upward motion with the lugs $l^2$ clear of the grooves $l$ in block L, a lateral movement in the proper direction will move the forked piece $k^2$ from over the fork $k$ and simultaneously therewith the lugs $h$ on sleeve H from under the hooks $h'$ on sleeve H′. The upward movement of the sleeve H is preferably also limited by the shoulder $s$ on bush $f$, Fig. 24.

Having thus described my invention, what I claim as new therein, and desire to secure by Letters Patent, is—

1. The combination with two sections of a sectional driving shaft provided with a forked coupling piece, of a coupling block, and separable pivotal connections between the block and the said forked pieces, said connections arranged at right angles to each other and to the major axis of the shaft sections, for the purpose set forth.

2. A shaft section provided at one end with a forked piece as $k^2$ the ears whereof are each provided with an inwardly projecting stud, a second shaft section also provided at one end with a forked piece as $k$, arranged at right angles to the forked piece $k^2$, the ears of said forked piece $k$ of reduced width and provided with pivot bearings, in combination with a connecting block, as L, pivotally connected with the ears of forked piece $k$ and provided with a groove in each of its opposite faces extending from one end of the block toward the other for the reception of the studs on the ears of the forked piece $k^2$, substantially as and for the purpose set forth.

3. The combination with an endwise movable shaft, and a clutch disk fast at one end thereof, of a driving pulley revoluble in fixed bearings, said pulley loose on the shaft, and provided with a clutch face adapted to engage the clutch disk, for the purpose set forth.

4. The combination with a vertically movable shaft, a clutch disk fast at one end thereof and a spring tending to lift the shaft, of a driving pulley revoluble in fixed bearings, said pulley loose on the shaft and provided with a clutch face held in engagement with the clutch disk against the stress of the spring by the weight of the shaft, for the purpose set forth.

5. The combination of two coupled shaft sections adapted to be uncoupled by endwise motion in opposite directions, a clutch disk fast on the end of the uppermost section, a spring tending to lift said section, and a sheathing for the lower section provided with hooks at its upper end, of a driving pulley revoluble in fixed bearings, said pulley loose on the upper shaft section and provided with a clutch face in engagement with the aforesaid clutch disk, and a sleeve having motion on said fixed bearing and provided with pins engaged by the hooks on said sheathing, for the purpose set forth.

6. In a machine such as described, the combination with the driving shaft, a bevel pinion on one end thereof, and a driven shaft provided at its proximate end with a like pinion, of a double crown wheel in gear with said pinions and revoluble about a fixed pivot, and bearings for said pivot connected with the driving and driven shafts respectively, whereby a hinge joint is formed between the shafts, for the purpose set forth.

7. In a machine such as described, the combination with the driving shaft section A′ carrying a bevel pinion $c'$, a bearing for said shaft, and the half casing $c^4$ provided with a sleeve $c^6$ fitted to the bearing, the stud $c^2$ screw-threaded at its outer end and the double crown wheel C revoluble on said stud and gearing with the aforesaid pinion, of the driven shaft A carrying a bevel pinion also in gear with the crown wheel, a bearing for said shaft, and a half casing $c^3$ similar to half casing $c^4$ fitted to said bearing and provided with an aperture for the threaded end of the stud and a nut for said threaded end, substantially as and for the purpose set forth.

8. In a machine such as described, the combination with the geared sections of the driven and driving shafts, the flexible section B and the sheathing $i$ of the shaft section I provided with fulcrum studs, of a counterbalancing lever fulcrumed on said studs and provided at its forward end with a bearing for the outer end of said flexible section, for the purpose set forth.

In witness whereof I have set my hand in presence of two witnesses.

HENRY BLAND.

Witnesses:
 EDWARD WATERS,
 WALTER SMYTHE BAYSTON.